(No Model.)

E. TERRY.
TYPE WRITING MACHINE.

No. 502,685. Patented Aug. 1, 1893.

WITNESSES:
H. A. Carhart,
D. May Goodrich

INVENTOR
Eugene Terry,
By Smith & Denison
ATTORNEYS.

UNITED STATES PATENT OFFICE.

EUGENE TERRY, OF ITHACA, NEW YORK, ASSIGNOR TO SCHUYLER GRANT, OF SAME PLACE.

TYPE-WRITING MACHINE.

SPECIFICATION forming part of Letters Patent No. 502,685, dated August 1, 1893.

Application filed May 15, 1893. Serial No. 474,273. (No model.)

*To all whom it may concern:*

Be it known that I, EUGENE TERRY, of Ithaca, in the county of Tompkins, in the State of New York, have invented new and useful Improvements in Guides for Keyboards for Type-Writing Machines, of which the following, taken in connection with the accompanying drawings, is a full, clear, and exact description.

My invention relates to attachments for typewriters, as a new article of manufacture, having particular reference to detachable finger-guides, suitably mounted upon the key-board, whereby I am enabled to locate easily, readily and without using the eyes, the respective keys thereof.

My object is to produce, as a new article of manufacture a device by which I can attain great speed in operating a typewriter, by allowing the eyes to be engaged continuously with the copy, while the fingers are enabled to find the respective keys by means of the guide pieces. And to that end my invention consists in the several novel features of construction and operation and combinations of parts hereinafter described and which are specifically set forth in the claim hereunto annexed. It is constructed as follows, reference being had to the accompanying drawings, in which—

Figure 1:
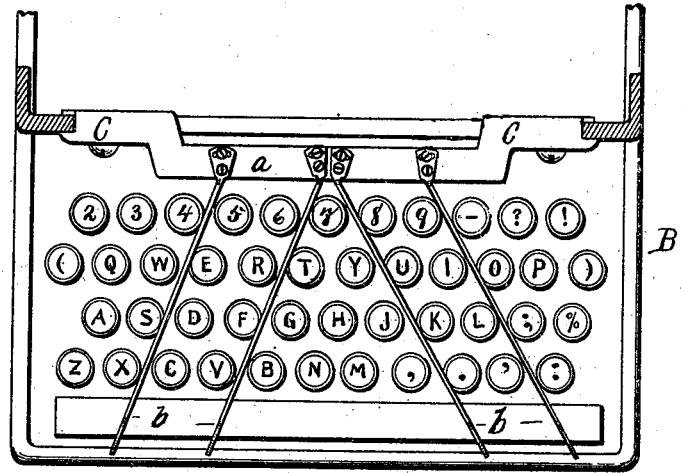
Figure 3:
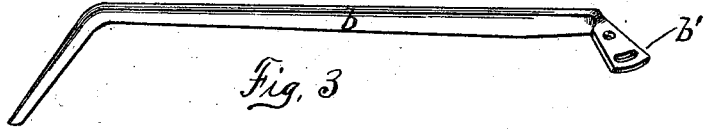
Figure 2:
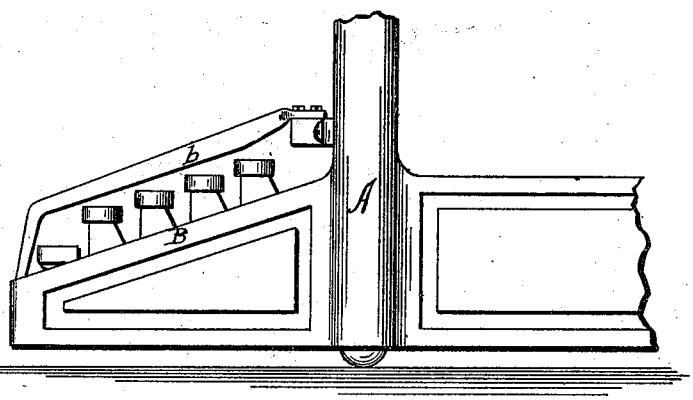

Figure 1, shows a top plan view of that portion of the typewriter containing the keyboard and showing a top plan view of the finger-guide secured thereto. Fig. 2, is a side view thereof. Fig. 3, is a view of one of the finger guides, detached, showing the means for its adjustment.

Similar letters of reference indicate corresponding parts.

A, is the frame of the typewriter, having the forwardly extending base or bracket —B— within which the keys are located in the ordinary way.

C, is a bar constructed substantially as shown in Fig. 1 having the forward projection —a—, to which the finger guides —b— are adjustably secured. That portion —a— of the bar —C— may be constructed as shown or slightly curved so as to pass around the type-bar rods to accustom itself to machines of various constructions; and the ends of the bar —C— are adapted to be adjusted to machines of various widths. The finger guides —b— are secured upon the arms so that they may be readily adjusted, by means of the elongated screw-hole $b'$, at any angle across the face of the key-board, so as to properly locate the various letters. It will be observed that it will be first necessary for the operator to learn the location of the finger pieces —b— with respect to the letters upon the key-board, and that the location of the letters will be more readily remembered with respect to the finger guides, by allowing the palms of the hands to rest upon the finger guides while not actively engaged in manipulating the keys.

What I claim as my invention, and desire to secure by Letters Patent, is—

A finger guide as a new article of manufacture, comprising a bar, means for securing it to the frame of a machine and finger pieces secured thereto and adapted to be adjusted so as to vary the angle transversely across the key-board, as set forth.

In witness whereof I have hereunto set my hand this 6th day of May, 1893.

EUGENE TERRY.

In presence of—
BRADFORD ALMY,
TRUMAN NOBLES.